United States Patent [19]
Kondo

[11] Patent Number: 5,832,021
[45] Date of Patent: Nov. 3, 1998

[54] CORRELATION DETECTOR FOR USE IN A SPREAD SPECTRUM COMMUNICATIONS RECEIVER

[75] Inventor: Tadayuki Kondo, Tokyo, Japan

[73] Assignee: NEC Corporation, Tokyo, Japan

[21] Appl. No.: 865,658

[22] Filed: May 30, 1997

[30] Foreign Application Priority Data

May 30, 1996 [JP] Japan ................................ 8-136934

[51] Int. Cl.$^6$ ............................ H04B 15/00; H01L 7/00; H04J 3/06
[52] U.S. Cl. ........................ 375/200; 375/208; 375/367; 370/350
[58] Field of Search ................. 375/1, 367, 200, 375/208, 365, 94, 376, 206, 343; 370/342, 350; 331/17, 25, 14

[56] References Cited

U.S. PATENT DOCUMENTS 5,029,181   7/1991   Endo et al. ................................. 375/1

FOREIGN PATENT DOCUMENTS 63-13440   1/1988   Japan .
2 189 969  11/1987  United Kingdom .
95/10903    4/1995  WIPO .

Primary Examiner—Stephen Chin
Assistant Examiner—Shuwang Liu
Attorney, Agent, or Firm—Foley & Lardner

[57] ABSTRACT

A digital delay-locked loop (DLL) circuit of high synchronous maintaining precision, which is usually affected by the quantization error of signal digitization, is provided for a spread spectrum communications receiver for mobile communications system. Three correlation sections are provided for calculating the correlation values in the peak phase, in the phase leading the peak phase and in the phase lagging behind the peak phase respectively in a delay profile on the basis of a received signal. A control section calculates the difference of the correlation values between the value in the lagging phase and the value of the advancing phase, and determines the threshold value for controlling a spread code generation section. The control section controls so as to advance the generation timing of spread code when the difference between the correlation values is greater than the positive threshold value, so as to delay the generation timing of when the difference value is smaller than the negative threshold value, and so as not to vary the generation timing when the difference value is smaller than the positive threshold value, but greater than the negative threshold value.

3 Claims, 10 Drawing Sheets

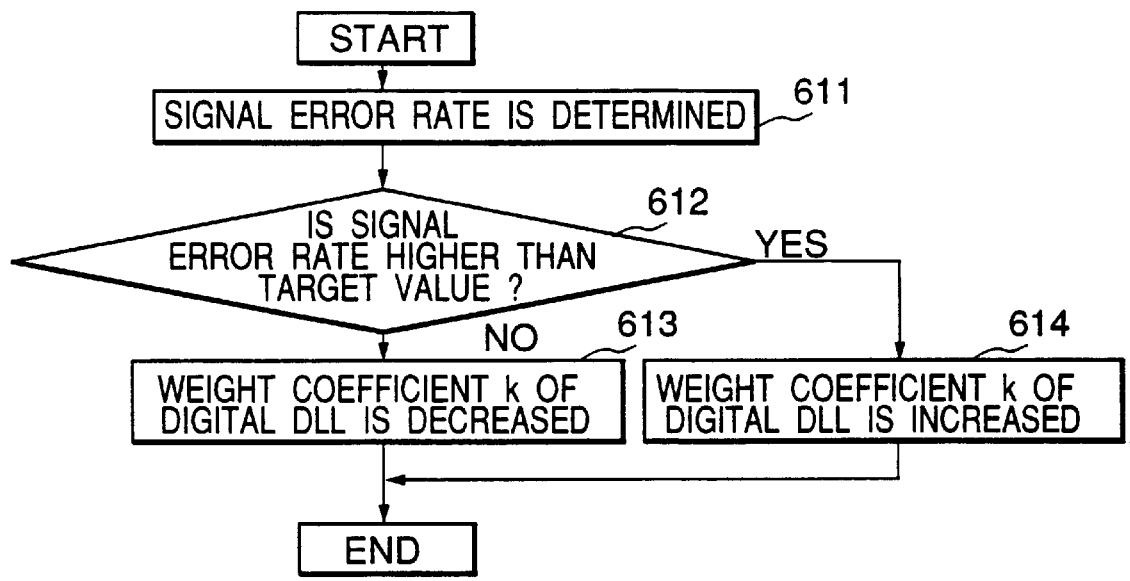
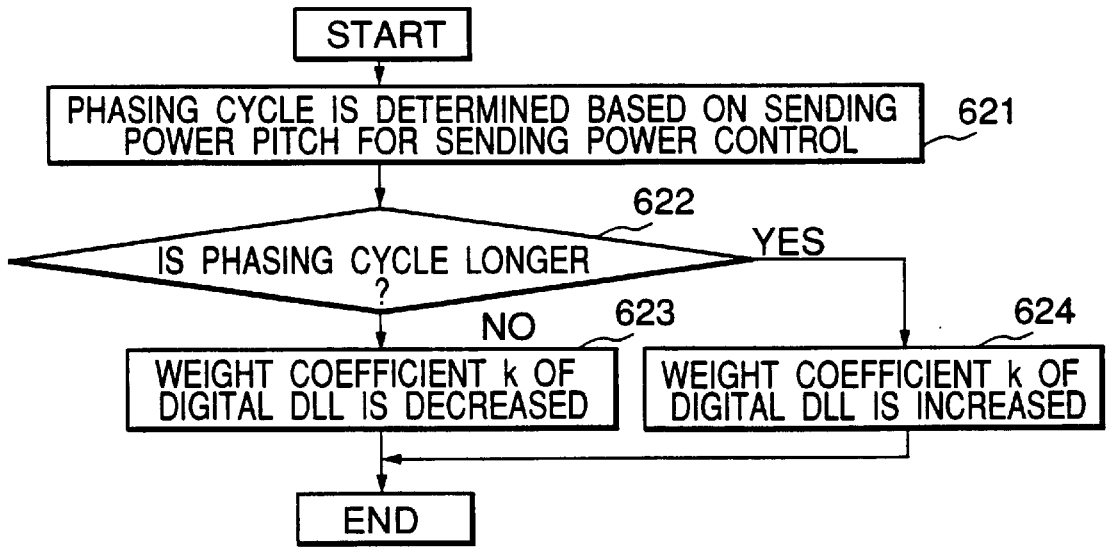

CORRELATION DETECTOR FOR USE IN A SPREAD SPECTRUM COMMUNICATIONS RECEIVER

BACKGROUND OF THE INVENTION

1. Field of the Invention

The present invention relates to a synchronous holding circuit for spread spectrum communications, and more particularly to a delay-locked loop constructed of a digital circuit.

2. Description of the Related Art

This type of synchronous holding circuit for spread spectrum communications according to the prior art is constructed of a delay-locked loop (hereunder referred to as "DLL") as illustrated in FIG. 10. The circuit will now be explained. The synchronous holding circuit for spread spectrum communications described in Japanese Unexamined Patent Application Disclosure SHO 63-13044, for example, is an analog circuit, or a digital circuit with a sampling interval which allows the quantization error to be disregarded.

A maximum length code sequence of binary codes expressed by ±1 (hereunder referred to as M sequence) accompanied by noise such as white noise is input to a terminal 400. An output signal (which is expressed by ±1) from the Nth stage of an M-sequence generator 450 constructed of N (N is an integer of 3 or more) staged feedback shift registers which generates codes in the same sequence as the spread code sequence used at the transmitting side, is correlated with the input signal through a first correlator 410. In addition, an output signal from the (N−2)th stage of the M-sequence generator 450 is correlated with the input signal through a second correlator 411, and the difference between the magnitudes of the outputs from the first and the second correlators 410 and 411 is output from a subtracter 420. The output from the subtracter 420 is smoothed through a loop filter 430 and is input to a voltage controlled oscillator 440 for control.

The oscillation frequency of the voltage controlled oscillator 440 is controlled by the output voltage from the loop filer 430, and the output signal therefrom is designed as a clock signal to the M-sequence generator 450.

With the DLL configured in this way, the output of the loop filter 430 reflects the difference between the value of correlation between the received signal and $P_N$, and the value of correlation between the received signal and $P_{N-2}$, wherein $P_N$ indicates a sequence of outputs from the Nth stage, and $P_{N-2}$ indicates a sequence of outputs from the (N−2)th stage. Assuming that the break period τ between the respective bits of the spread code generated by the spread code generator at the transmitting side is one chip, the value of correlation between $P_N$ and the received signal is 0 when the phase difference between them is one or more chips, whereas the correlation value is the maximum when they are just in phase. $P_{N-2}$ mentioned above has the maximum degree of correlation in the phase two-chip apart therefrom. Accordingly, when the (N−1)th stage is considered to be the center, for example, the output of the loop filter 430 is the maximum positive value when the phase error is −τ, the minimum negative value when the phase error is +τ, and zero when the phase error is ±2τ or more (cf. FIG. 11(A)). The output is just zero as well when the phase error is 0. When the phase error is 0, the output signal from the (N−1)th stage and the received signal are in phase with each other. That is, the correlation between the output signal from the (N−1)th stage and the received signal is illustrated in FIG. 11(B).

As is understood from the foregoing description, when the oscillation frequency of the voltage controlled oscillator 440 is controlled so that the output of the loop filter 430 is 0, the phase of the output from the M-sequence generator 450 may be controlled to a given value for synchronization, and the correlation demodulation of the received signal may be performed using the synchronous timing.

The problem of the prior art described above is that the quality of the signal is degraded due to the quantization error which is produced during sampling of the received signal in the case where the DLL is constructed of a digital circuit with a digital signal processor (hereunder referred to as "DSP"), for example, for reduction of the circuit size.

The reason is that the synchronous timing for correlation demodulation which is determined by a DLL constructed of a digital circuit (hereunder referred to as "digital DLL") swings like a pendulum around the synchronous timing which provides the maximum value of correlation between the received signal and the spread code for correlation demodulation, due to the quantization error produced during sampling of the received signal, and thus an ideal synchronous timing is not maintained, thereby impairing synchronous holding precision.

SUMMARY OF THE INVENTION

It is therefore an object of the present invention to minimize the quantization error which is produced when the received signal is sampled, in order to prevent the signal quality from being impaired in cases where the DLL is constructed of a digital circuit for simplicity of the circuit configuration.

The present invention provides a spread spectrum communications receiver for mobile communications system, characterized by comprising:

correlation means for calculating the correlation value in the peak phase, the correlation value in the phase leading the peak phase and the correlation value in the phase lagging behind the peak phase in a delayed profile of correlation values, on the basis of a received signal;

spread code generation means; and a control section which controls the spread code generation means on the basis of the correlation values from the correlation means, wherein the control section comprises means of calculating the difference between the correlation value in the phase leading the peak phase and the correlation value in the phase lagging behind the peak phase as the difference between the correlation values, means of determining the threshold value of a digital DLL; and means of comparing the difference between the correlation values with the threshold value of the digital DLL to control the spread code generation means so as to advance the phase of the shift register of the correlation means when the difference between the correlation values is greater than the positive threshold value of the digital DLL, so as to delay the phase of the shift register of the correlation means when the difference between the correlation values is smaller than the negative threshold value of the digital DLL, and so as not to vary the phase of the shift register of the correlation means when the difference between the correlation values is smaller than the positive threshold value of the digital DLL, and the difference between the correlation values is greater than the negative threshold value of the digital DLL.

Preferably, the control section further comprises means of calculating the threshold value of the digital DLL by multiplying, by a weight coefficient, the value calculated by subtracting the minimum correlation value among the correlation value in the peak phase, the correlation value in the phase lagging behind the peak phase and the correlation value in the phase leading the peak phase, from the correlation value in the peak phase.

According to the present invention, the digital DLL circuit may further comprise means of determining the error rate of the received signal on the basis of the correlation values from the correlation means, and the control section may be designed to increase the weight coefficient when the error rate is high, and to decrease the weight coefficient when the error rate is low.

According to the present invention, the digital DLL circuit may be characterized by further comprising means of determining the phasing cycle on the basis of the correlation values from the correlation means, referred to the received level, and in that the control section is designed to increase the weight coefficient when the phasing cycle is long, and to decrease the weight coefficient when the phasing cycle is short.

BRIEF DESCRIPTION OF THE DRAWINGS

FIG. 6 is a flow chart illustrative of the operation of the control section for determining the weight coefficient k of a digital DLL according to a first embodiment;

FIG. 7 is a flow chart illustrative of the operation of the control section for determining the weight coefficient k of a digital DLL according to a second embodiment;

FIG. 8 includes views illustrative of the operation of correlation sections according to an embodiment of the present invention, wherein

FIG. 9 includes views illustrative of the operation of correlation sections according to an embodiment of the present invention, wherein

FIG. 11 includes views illustrative of the operation of the delay locked loop shown in FIG. 10, wherein FIG. 11(A) is an output characteristic profile of a loop filter, and FIG. 11(B) is a correlation profile.

DETAILED DESCRIPTION

Figure 1:
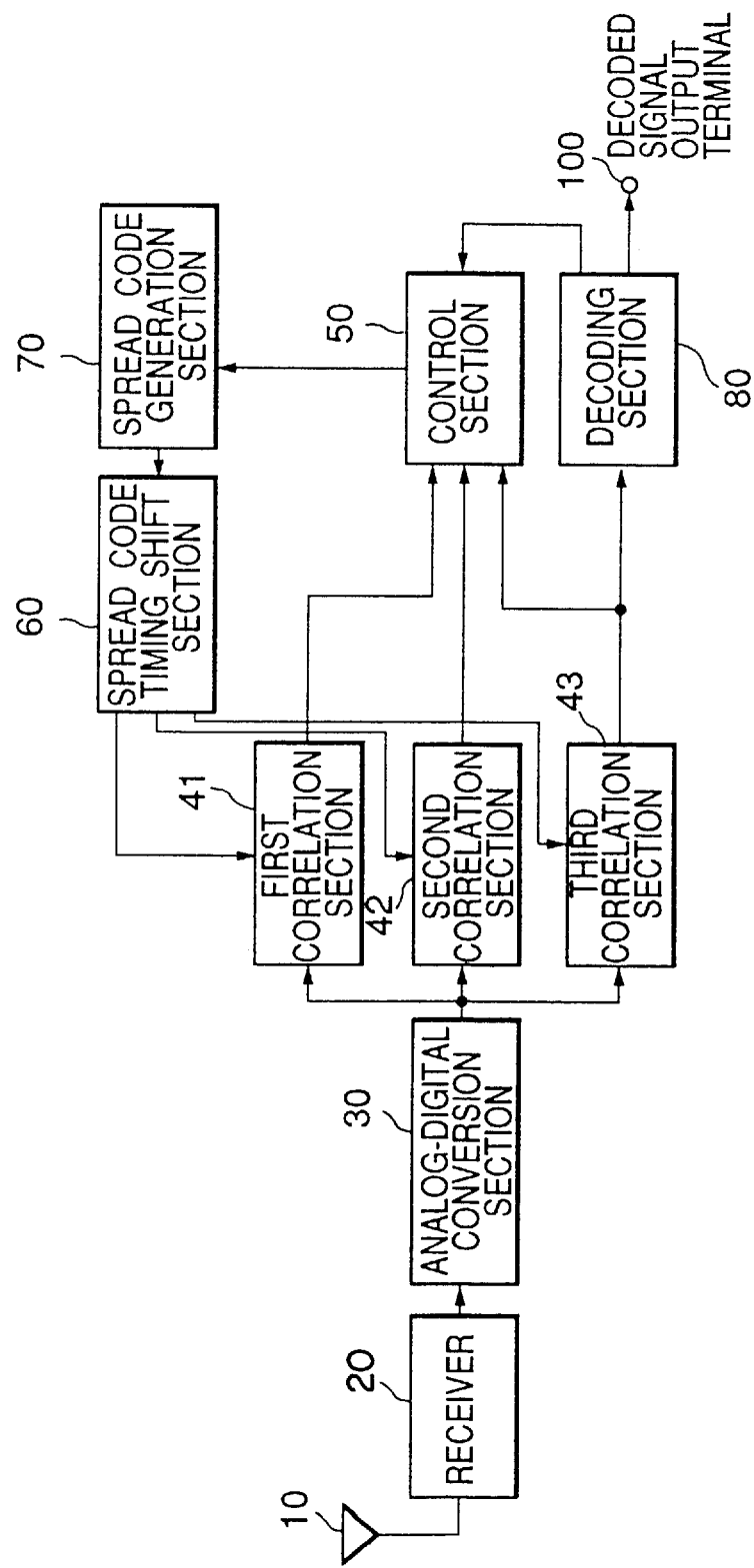
FIG. 1 is a block diagram illustrative of the configuration of a first embodiment according to the present invention.

The operation of a digital DLL circuit according to a first embodiment of the present invention will now be described with reference to FIG. 1. A control section 50 adjusts the timing of a spread code generation section 70 so as to maximize the correlation value from a third correlation section 43 among the correlation values from first, second and third correlation sections 41, 42 and 43. Here, the threshold value of the digital DLL is determined on the basis of the weight coefficient of the digital DLL for performing the wanted digital DLL which is in turn determined based on the error rate of the decoded signal input from a decoding section 80, and the correlation values which are input from the first through third correlation sections 41–43, and is set as the threshold value of the DLL which is determined on the basis of the correlation values input from the first and second correlation sections, so that the timing of the spread code generation section 70 is not varied unless the lag is approximately half or more the sampling interval of the digital DLL. This allows the quantization error produced during sampling of the received signal to reduce and prevents the signal quality from being impaired.

The operation of a digital DLL circuit according to a second embodiment of the present invention will now be described with reference to FIG. 2. A control section 50 adjusts the timing of a spread code generation section 70 so as to maximize the correlation value from a third correlation section 43 among the correlation values from first through third correlation sections 41–43. Here, the threshold value of the digital DLL is determined on the basis of the weight coefficient of the digital DLL for performing the wanted digital DLL which is in turn determined based on the phasing cycle input from a received-signal measurement section 90, and the correlation values which are input from the first through third correlation sections 41–43, and is set as the threshold value of the DLL which is determined on the basis of the correlation values input from the first and second correlation sections, so that the timing of the spread code generation section 70 is not varied unless the lag is approximately half or more the sampling interval of the digital DLL. This allows the quantization error produced during sampling of the received signal to reduce and prevents the signal quality from being impaired.

DETAILED DESCRIPTION OF THE PREFERRED EMBODIMENTS

Embodiments of the present invention will now be described in detail with reference to the drawings. Referring to FIG. 1, a first embodiment of the present invention comprises a receiver 20 which decodes a signal which is received via an antenna 10, an analog-digital conversion section 30 which converts the analog signal from the receiver 20 to a digital signal, first through third correlation sections 41–43 which determine the value of correlation between the digital signal which is output from the analog-digital conversion section 30 and a spread code from a spread code timing shift section 60, a control section 50 which adjusts the timing of a spread code generation section 70 on the basis of the correlation values from the first through third correlation sections 41–43 so that the correlation value from the third correlation section is the highest, and a decoding section 80 which decodes the correlation value from the third correlation section 43 to notify the control section 50 of the error rate of the decoded signal, and outputs the decoded signal to a decoded signal output terminal 100.

Figure 3:
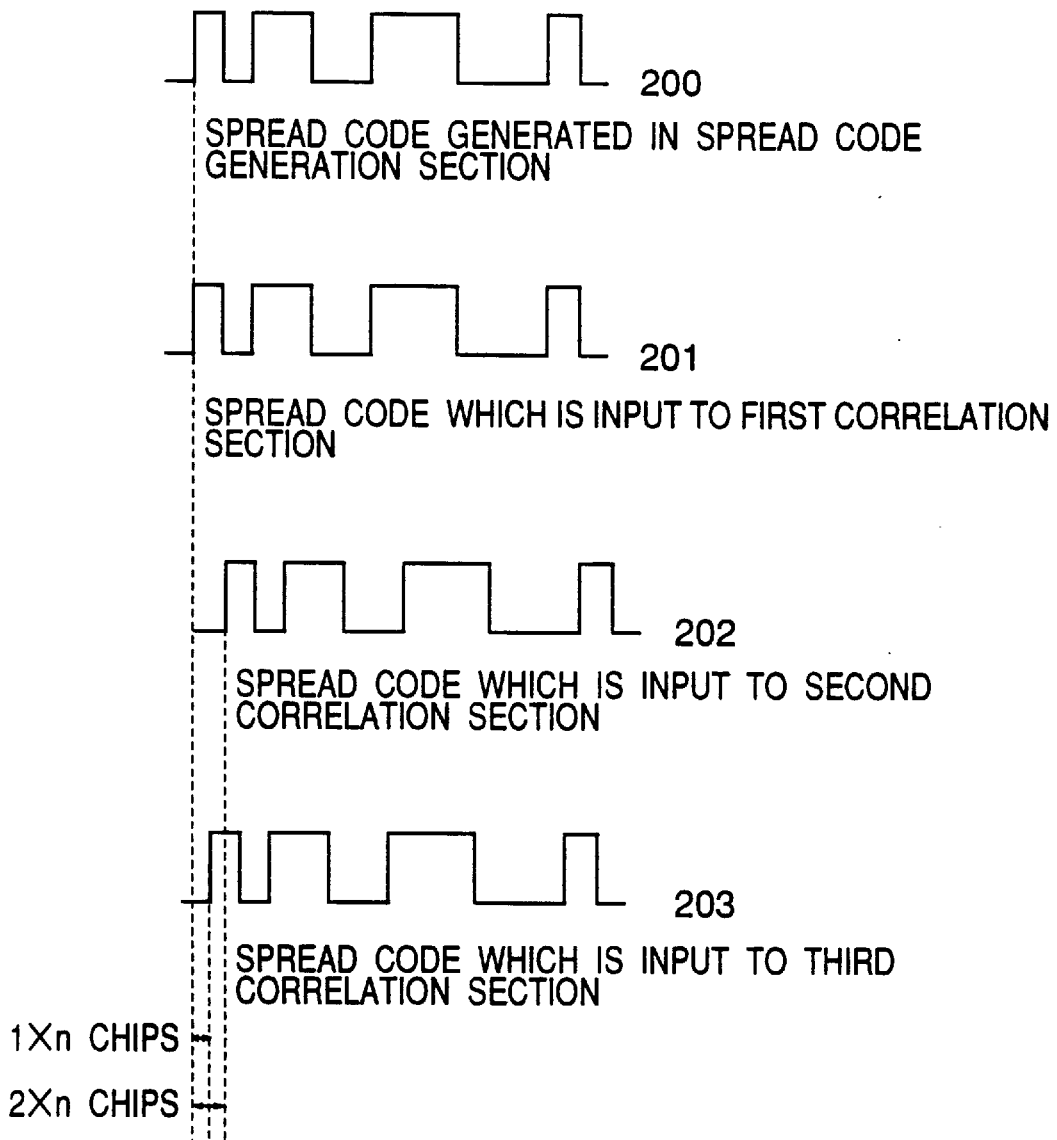
FIG. 3 is a waveform chart illustrative of an example of the spread code according to an embodiment of the present invention.

The timing of the signal which is output from the spread code timing shift section 60 will now de explained with reference to FIG. 3. The spread code timing shift section 60 generates a spread code 201 for supplying the signal 200 which is output from the spread code generation section 70 to the first correlation section 41 without shifting it, a spread code 203 for supplying the signal 200 to the third correlation section 43 in an n-chip shifted manner, and a spread code 202 for supplying the signal 200 to the second correlation section 42 in a 2 x n-chip shifted manner.

The operation of the first embodiment of the present invention will now be described. The signal decoded by the receiver 20 via the antenna 10 is converted into a digital signal through the analog-digital conversion section 30. The converted digital signal is input to the first through third correlation sections 41–43, and the values of correlation between the converted digital signal and the spread codes input from the spread code timing shift section 60 are determined in the first through third correlation sections 41–43 and then sent to the control section 50. The correlation value output from the third correlation section 43 is decoded through the decoding section 80, and the error rate of the decoded signal is notified to the control section 50. The decoded signal is output through the decoded signal output terminal 100.

Figure 4:
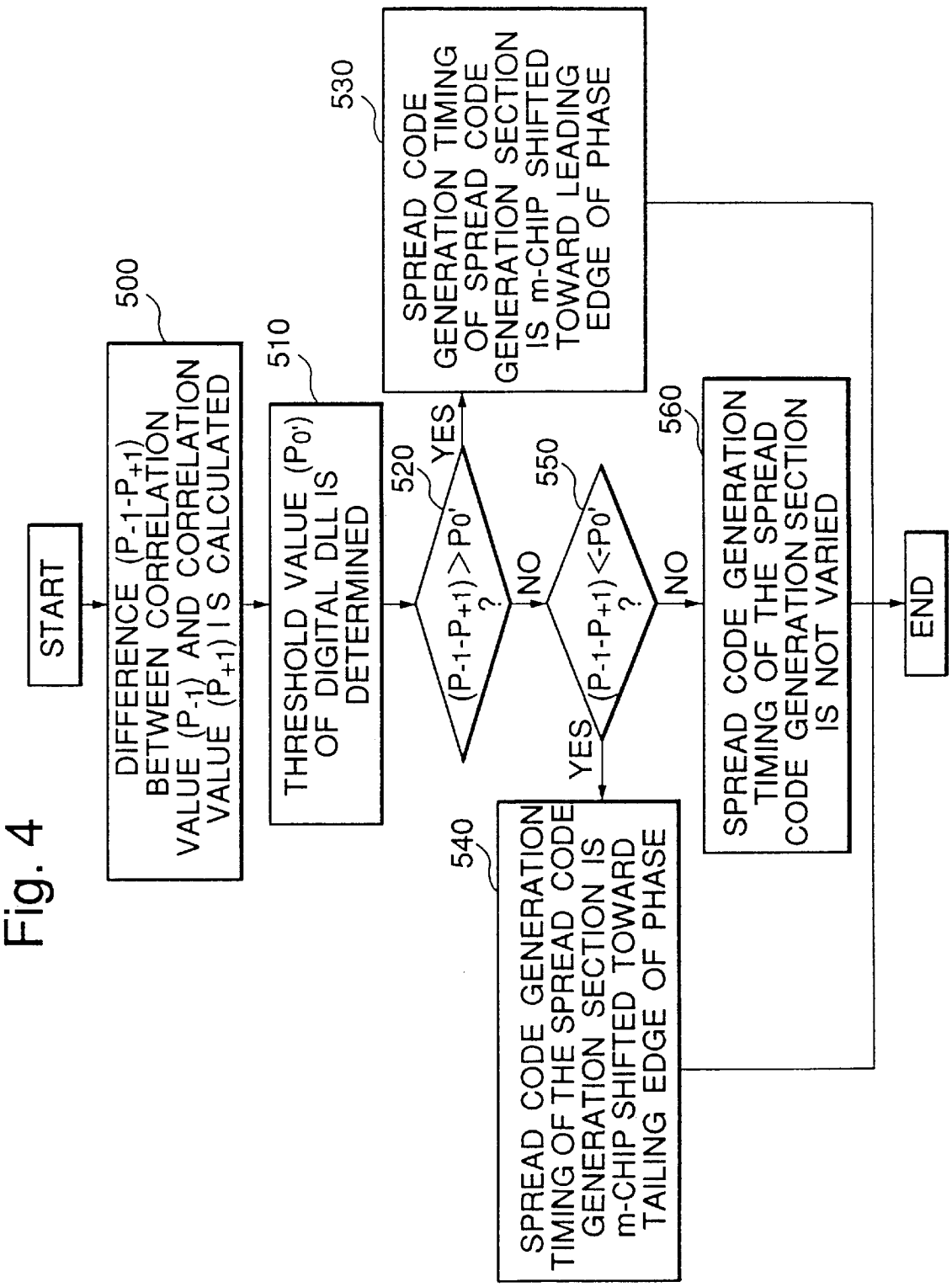
FIG. 4 is a flow chart illustrative of the synchronous seizing operation of the embodiment of the present invention.

The operation of the control section 50 will now be described in detail with reference to FIG. 4. The correlation value ($P_{+1}$) from the first correlation section 41, the correlation value ($P_{-1}$) from the second correlation section 42 and the correlation value ($P_0$) from the third correlation section 43 are input to the control section 50 to calculate the difference ($P_{-1}-P_{+1}$) between the correlation value ($P_{-1}$) and the correlation value ($P_{1+}$) (step 500). The threshold value $P_{0'}$ of the digital DLL is then determined (step 510). The difference ($P_{-1}-P_{+1}$) between the correlation value ($P_{-1}$) and the correlation value ($P_{+1}$) is compared with the threshold value ($P_{0'}$) of the digital DLL (step 520).

When ($P_{-1}-P_{+1}$) >$P_{0'}$, the spread code generation timing of the spread code generation section 70 is m-chip shifted toward the leading edge of the phase (step 530). On the other hand, when ($P_{-1}-P_{+1}$)<−$P_{0'}$, the spread code generation timing of the spread code generation section 70 is m-chip shifted toward the tailing edge of the phase (step 540). In the other cases, that is, when −$P_{0'}$≦($P_{-1}-P_{+1}$)≦$P_{0'}$, the spread code generation timing of the spread code generation section 70 is not varied (step 560). Here, the value of m, which is the amount of shifting of the spread code generation timing, is n or less, and preferably is equal to the sampling interval.

A method of determining the threshold value $P_{0'}$ of the digital DLL in step 510 will now be described with reference to FIG. 5. The minimum correlation value ($P_{min}$) among the correlation value ($P_{30\ 1}$), the correlation value ($P_0$) and the correlation value ($P_{-1}$) is determined (step 601). The minimum correlation value ($P_{min}$) is subtracted from the correlation value ($P_0$) to determine the value ($P_0-P_{min}$) (step 602). The weight coefficient k of the digital DLL is determined (step 603). Finally, the value ($P_0-P_{min}$) calculated by subtracting the minimum correlation value ($P_{min}$) from the correlation value ($P_0$) is multiplied by the weight coefficient k of the digital DLL to determine the threshold value $P_{0'}$ of the digital DLL (step 604).

This allows the quantization error due to sampling to be minimized and the impairment of the decoding characteristics of the digital DLL to be reduced.

Figure 8A:
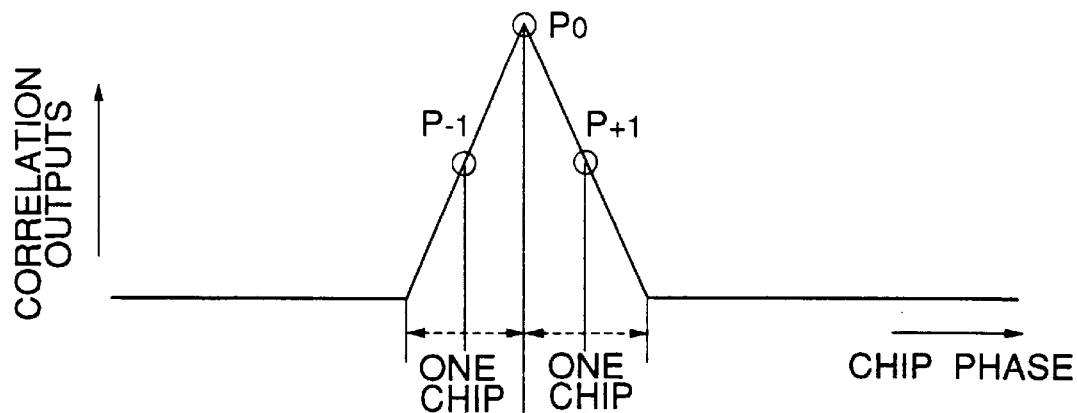
FIG. 8(A) is an illustration of the delay profile of an example of single path.

For example, it is assumed that the signal 200 output from the spread code generation section 70 is ½-chip shifted through the spread code timing shift section 60 and supplied to the third correlation section 43, while one-chip shifted and supplied to the second correlation section 42, the sampling interval is a ¼ chip, and the weight coefficient k of the digital DLL is 0.5. In the case of single path, since the minimum value ($P_{min}$) among $P_{-1}$, $P_0$ and $P_{+1}$ is $P_0$/2, half the correlation value ($P_0$) at the peak of the delay profile illustrated in FIG. 8(A) as an example of single path, and thus the threshold value ($P_{0'}$) of the digital DLL is calculated to be $P_0$/4 by multiplying ($P_0-P_{min}$) by the weight coefficient k of the digital DLL=0.5.

Figure 8B:
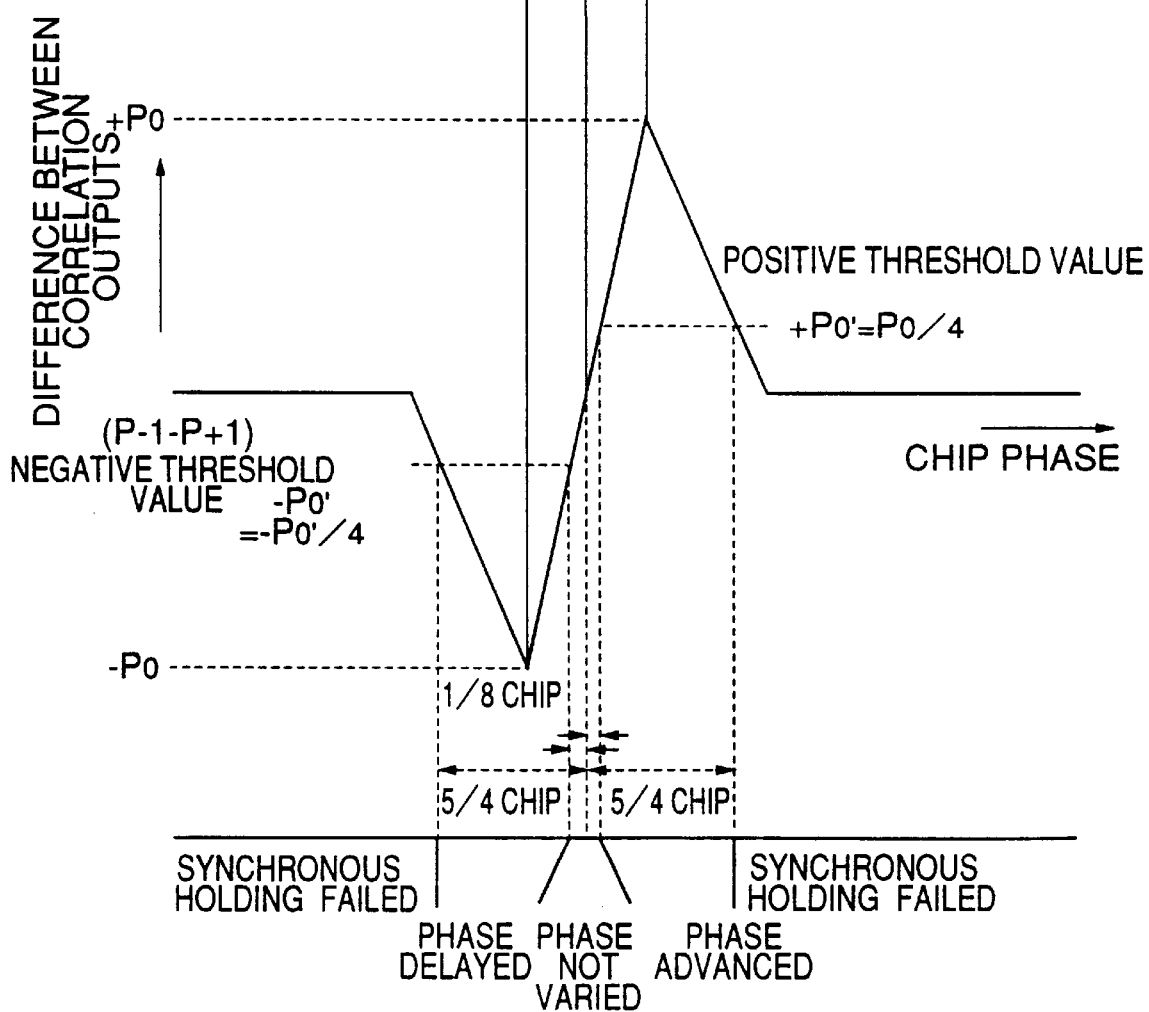
FIG. 8(B) is an illustration of the chip phase characteristic of the DLL control signal as an example of single path.

Referring to the chip phase characteristic of a DLL control signal which is illustrated in FIG. 8(B) as an example of single path, the value of |$P_{-1}-P_{+1}$| ±⅛-chip out of phase with the chip phase where the digital DLL is locked at an optimum point and $P_{-1}$=$P_{+1}$, is $P_0$/4. Here, in cases where the lag of the digital DLL from the optimum point of the digital DLL is within ±⅛ chip, the generation timing of the spread code which is generated in the spread code generation section 70 is not varied, and the spread code generation timing is varied when the lag is over ±⅛ chip; this allows the quantization error due to sampling to be minimized.

Figure 9A:
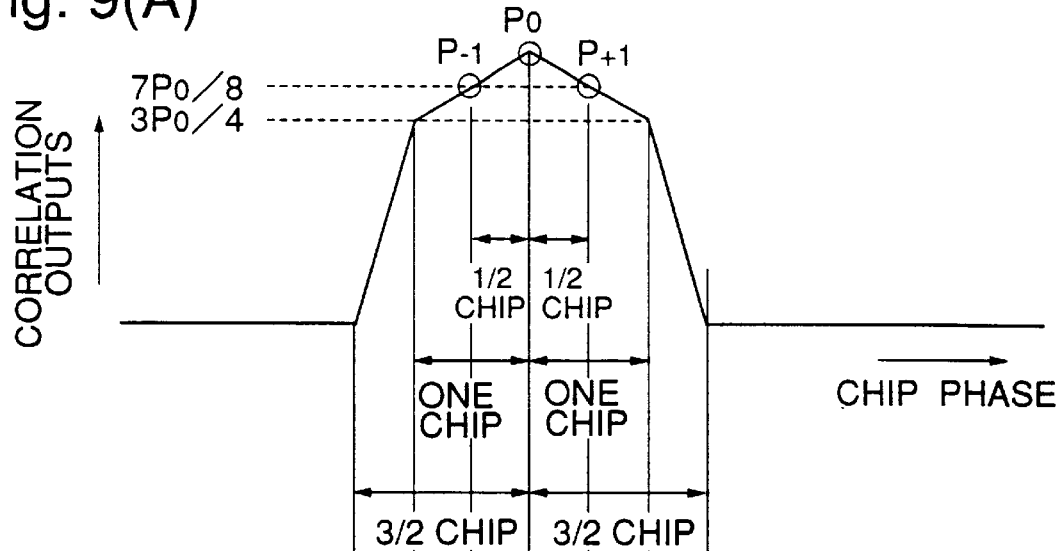
FIG. 9(A) is an illustration of the delay profile of an example of multipath.

Also, in the case of multipath, since the minimum value ($P_{min}$) among $P_{-1}$, $P_0$ and $P_{+1}$ is 7$P_0$/8, 7/8 times the correlation value ($P_o$) of the delay profile illustrated in FIG. 9(A) as an example of multipath, and thus the threshold value ($P_{0'}$) of the digital DLL is calculated to be $P_0$/16 by multiplying $P_0-P_{min}$) by the weight coefficient k of the digital DLL=0.5.

Figure 9B:
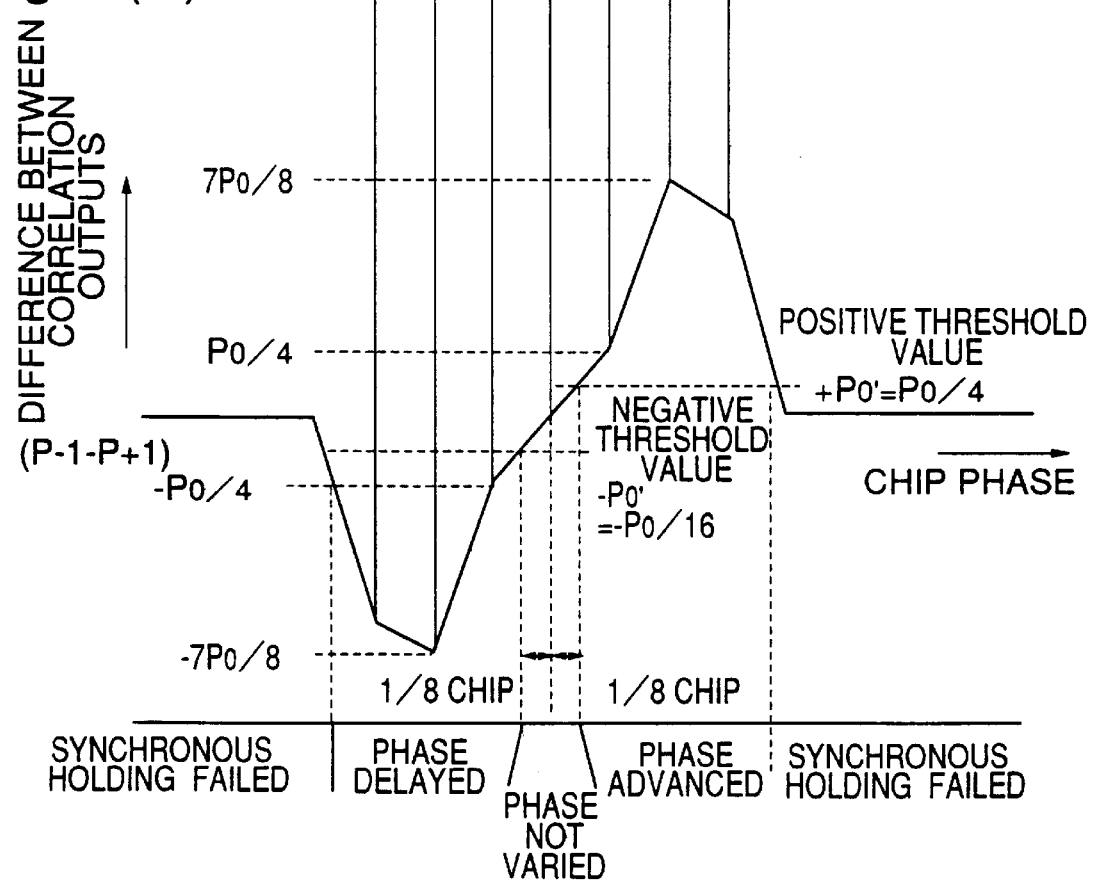
FIG. 9(B) is an illustration of the chip phase characteristic of the DLL control signal as an example of multipath.
Figure 10:
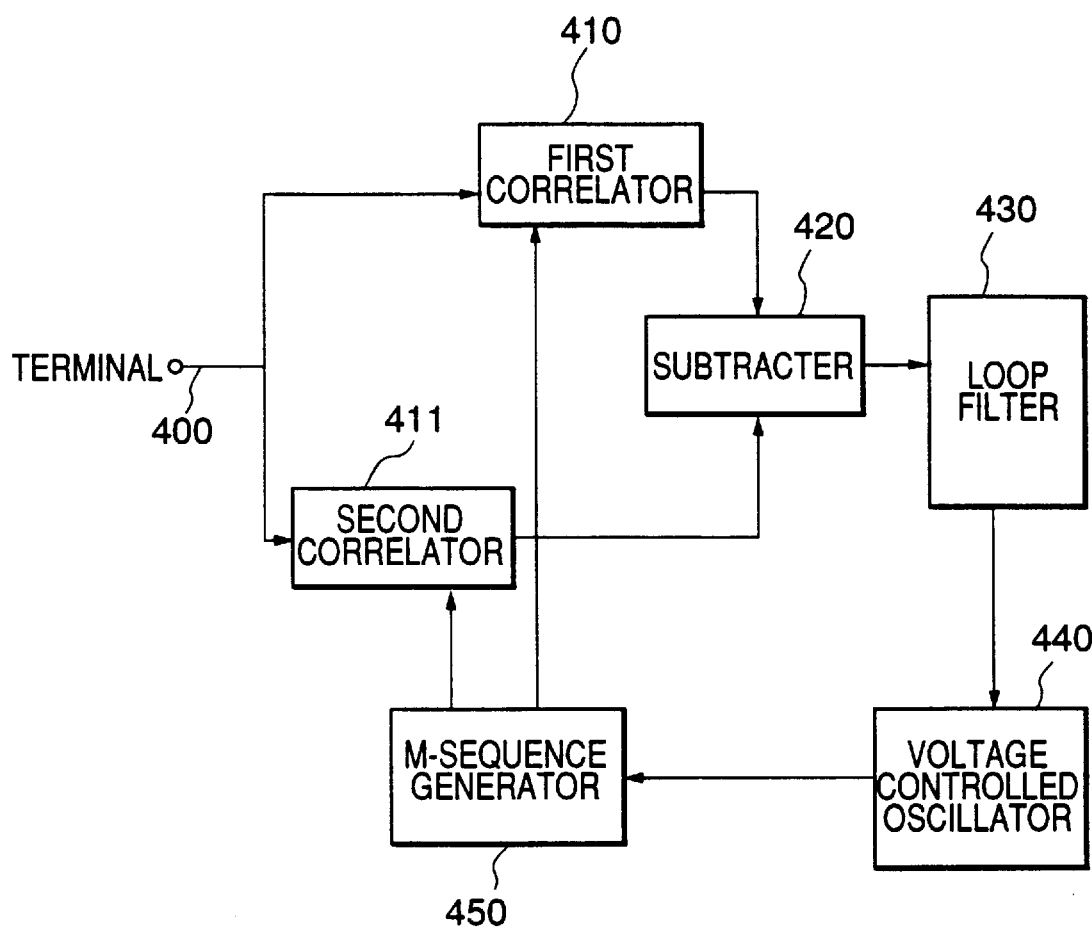
FIG. 10 is a block diagram illustrative of a conventional delay locked loop.
Figure 11:
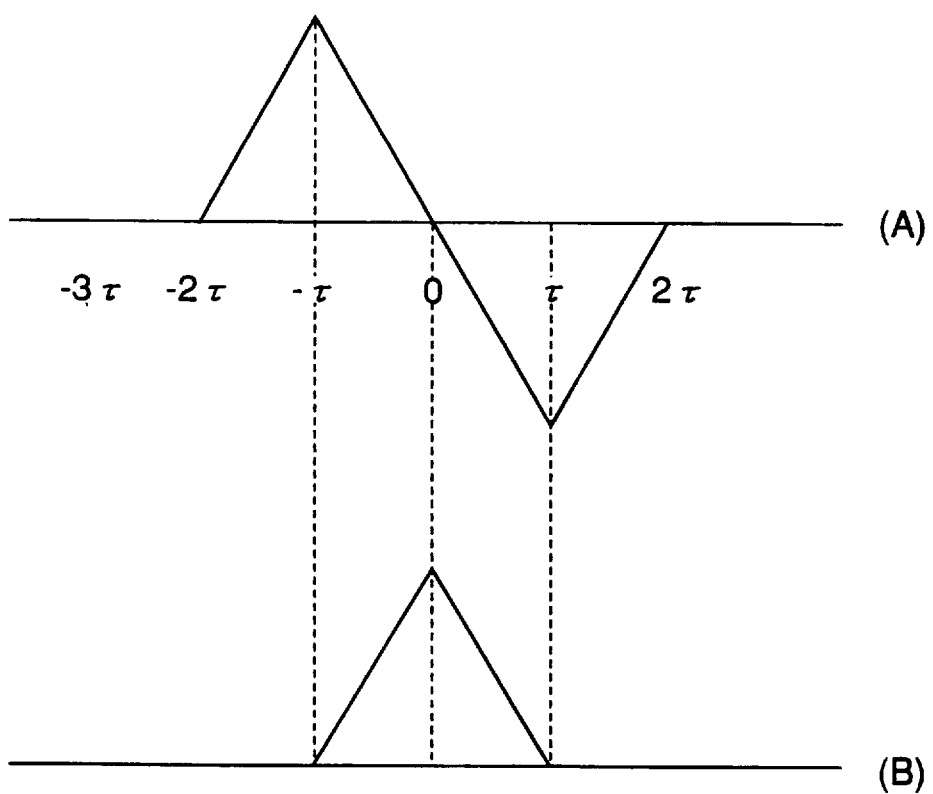

Referring to the chip phase characteristics of a DLL control signal which is illustrated in FIG. 9(B) as an example of multipath, the value of |$P_{-1}-P_{+1}$| ±⅛-chip out of phase with the chip phase where the digital DLL is locked at an optimum point and $P_{-1}$=$P_{+1}$, is $P_0$/16. Here, in cases where the lag of the digital DLL from the optimum point of the digital DLL is within ±⅛ chip, the generation timing of the spread code which is generated in the spread code generation section 70 is not varied, and the spread code generation timing is varied when the lag is over ±⅛ chip; this allows the quantization error due to sampling to be minimized.

As described above, in both the case of single path and the case of multipath, it is possible to minimize the quantization error due to sampling and to reduce the impairment of the decoding characteristics of the digital DLL by varying the threshold value of the digital DLL depending on the correlation values.

Figure 5:
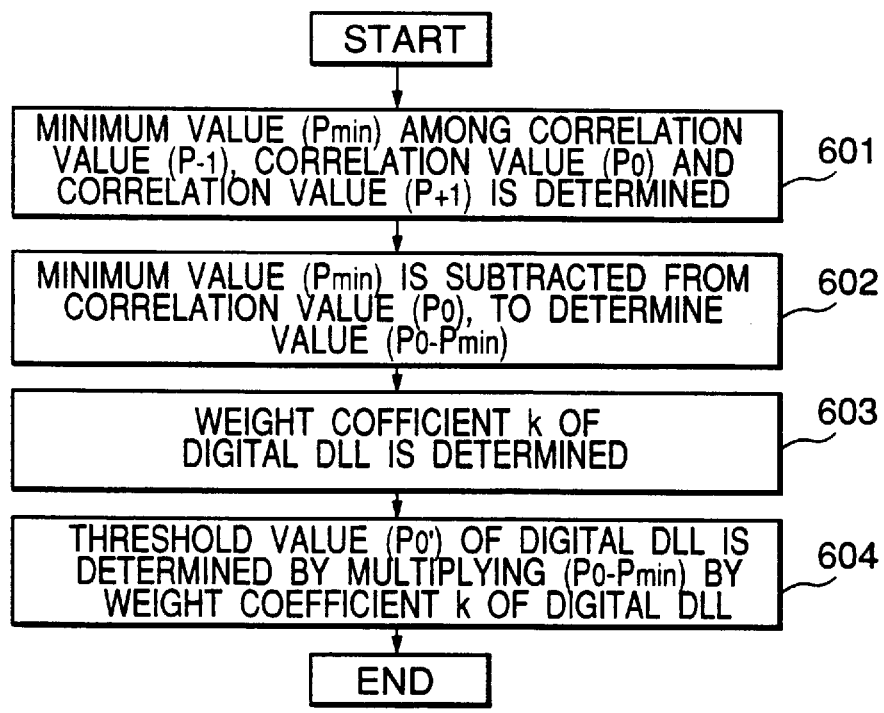
FIG. 5 is a flow chart illustrative of the operation of the control section for determining the threshold value of a digital DLL according to the embodiment of the present invention.

The weight coefficient k of the digital DLL is determined in step 603 in FIG. 5 by the procedure as illustrated in FIG. 6 when a digital DLL circuit according to the first embodiment of the present invention is used. The procedure for determining the weight coefficient k of the digital DLL will now be described with reference to FIG. 6. The signal error rate determined by the decoding section 80 in step 611 is input to compare the signal error rate with a target value (e.g., a 1% error rate when the signal error rate is expressed as frame error rate) (step 612). In cases where the result of comparison is that the signal error rate compares unfavorably with the target value, that is, the signal error rate is higher, the weight coefficient k of the digital DLL is increased (step 614). On the other hand, when the signal error rate compares favorably with the target value, that is, when the signal error rate is lower, the weight coefficient k of the digital DLL is decreased (step 613).

Alternatively, the weight coefficient k of the digital DLL may be determined in step 603 by the procedure as illustrated in FIG. 7 when a digital DLL circuit according to a second embodiment of the present invention is used.

The alternative procedure for determining the weight coefficient k of the digital DLL will now be described with reference to FIG. 7. In step 621, the phasing cycle determined by the received-level measurement section 90 (cf. FIG. 2) is input to compare the phasing cycle with a reference cycle (step 622). In cases where the result of comparison is that the phasing cycle is longer than the reference cycle, the value of the weight coefficient k of the digital DLL is increased (step 624). On the other hand, when the phasing cycle is shorter than the reference cycle, the value of the weight coefficient k of the digital DLL is decreased (step 623).

As a result, the digital DLL satisfactorily responds to the change in the propagation delay. The larger the amount of change in the propagation delay, the shorter the phasing cycle is. Here, the threshold value $P_{0'}$ of the DLL is lowered by decreasing the weight coefficient k of the digital DLL, thus facilitating the digital DLL to respond to the change in the propagation delay. On the other hand, the smaller the amount of change in the propagation delay, the longer the phasing cycle is. Here, the threshold value $P_{0'}$ of the digital DLL is increased by increasing the weight coefficient k of the digital DLL, and the timing of the digital DLL is not varied.

The operation of the first embodiment of the present invention will now be described in detail with reference to FIG. 4 and FIG. 5. For example, when the correlation value $(P_{+1})$ is 0.6, the correlation value $(P_0)$ is 1.0, the correlation value $(P_{-1})$ is 0.7, and the weight coefficient k of the digital DLL is 0.5, the difference $(P_{-1}-P_{+1})$ between the correlation value $(P_{-1})$ and the correlation value $(P_{+1})$ is 0.1 (step 500). In addition, the minimum value $(P_{min})$ among the correlation value $(P_{+1})$, the correlation value $(P_0)$ and the correlation value $(P_{-1})$ is 0.6 (step 601). The value calculated by subtracting the minimum correlation value $(P_{min})$ from the correlation value $(P_0)$ is 0.4 (step 602). The value calculated by subtracting the minimum correlation value $(P_{min})$ from the correlation value $(P_0)$ and multiplied by the weight coefficient k of the digital DLL=0.5 is 0.2 (step 604).

The spread code generation timing of the spread code generation section 70 is not varied (step 560), since the result of comparison between the difference $(P_{-1}-P_{+1})$ between the correlation value $(P_{-1})$ and the correlation value $(P_{+1})$, and the threshold value of the DLL $(P_{0'})$ is neither $(P_{-1}-P_{+1})>P_{0'}$ (step 520) nor $(P_{-1}-P_{+1})<-P_{0'}$ (step 550), but $-P_{0'}=0.2\pm(P_{-1}-P_{+1})=0.1\pm P_{0'}=0.2$.

An explanation will now be given regarding the case where the signal error rate compares unfavorably with the target value. Assuming that the correlation value $(P_{+1})$ is 0.6, the correlation value $(P_0)$ is 1.0, the correlation value $(P_{-1})$ is 0.8, and the update step of the weight coefficient k of the digital DLL is 0.1, the weight coefficient k of the digital DLL is 0.4. The difference $(P_{-1}-P_{+1})$ between the correlation value $(P_{-1})$ and the correlation value $(P_{+1})$ is 0.2 (step 500). The minimum value $(P_{min})$ among the correlation value $(P_{+1})$, the correlation value $(P_0)$ and the correlation value $(P_{-1})$ is 0.6 (step 601). The value calculated by subtracting the minimum correlation value $(P_{min})$ from the correlation value $(P_0)$ is 0.4 (step 602). The value calculated by subtracting the minimum correlation value $(P_{min})$ from the correlation value $(P_0)$ and multiplied by the weight coefficient k of the digital DLL=0.4 is 0.16 (step 604).

The spread code generation timing of the spread code generation section 70 is shifted toward the leading edge of phase (step 530), since the result of comparison between the difference $(P_{-1}-P_{+1})$ between the correlation value $(P_{-1})$ and the correlation value $(P_{+1})$, and the threshold value of the DLL $(P_{0'})$ is $(P_{-1}-P_{+1})=0.2>P_{0'}=0.16$ (step 520).

Figure 2:
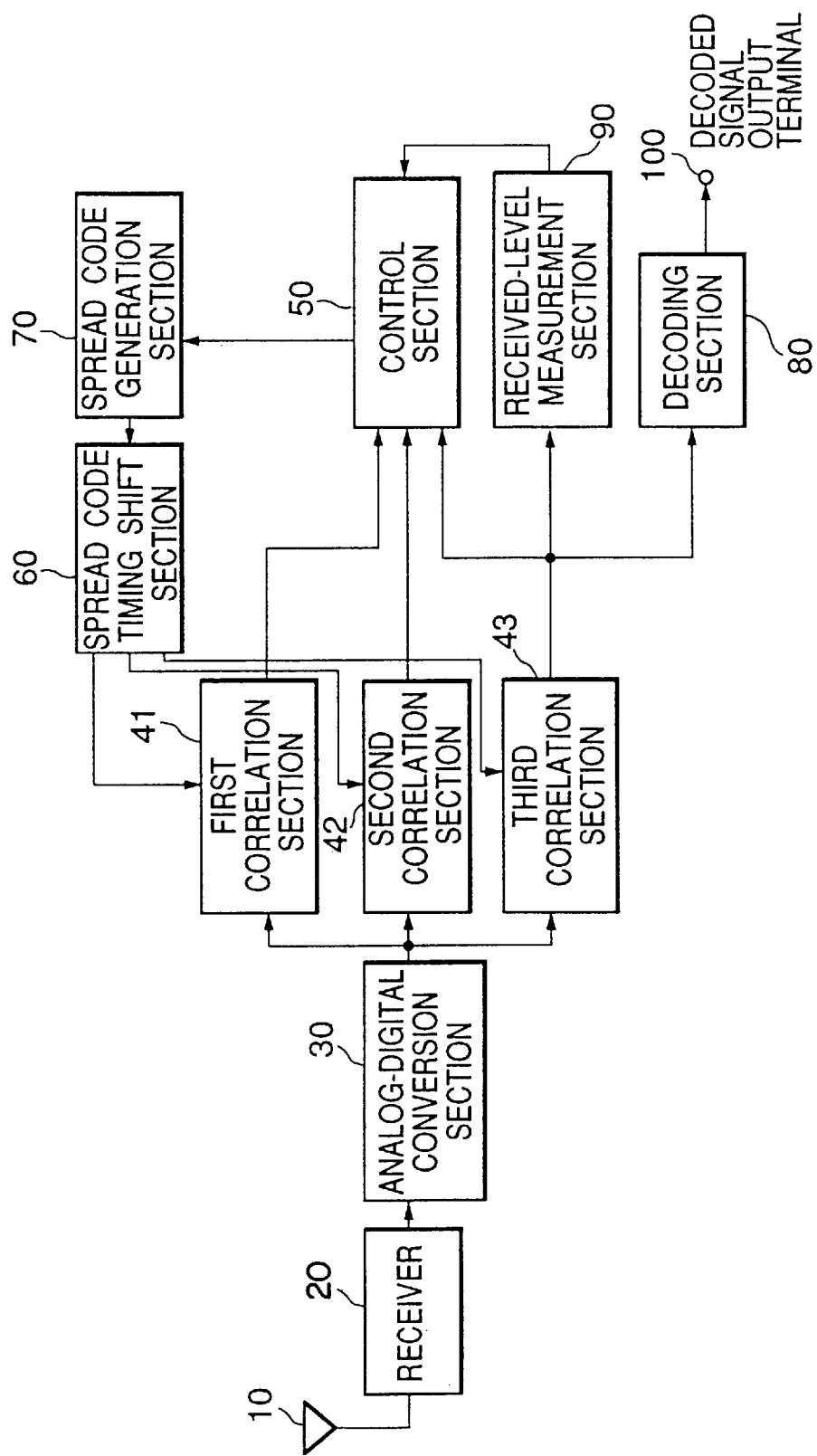
FIG. 2 is a block diagram illustrative of the configuration of a second embodiment according to the present invention.

Referring to FIG. 2, a second embodiment according to the present invention is constructed by the addition of a received-level measurement section 90 to the first embodiment according to the present invention. Since a phasing cycle is input to the received-level measurement section 90 instead of the signal error rate input from the decoding section 80, the received level is calculated on the basis of the correlation value from the third correlation section 43, the phasing cycle is determined based on the received level, and the phasing cycle is notified to the control section 50.

The operation of the second embodiment will now be described. The operation of the second embodiment is different from that of the first embodiment in that a separate method is used for determining the weight coefficient k of the digital DLL in order to determine the threshold value $P_{0'}$ of the digital DLL in the control section 50.

The weight coefficient k of a digital DLL according to the second embodiment of the present invention is determined by referring to the flow chart in FIG. 7 referred to above. The phasing cycle is determined in the received-level measurement section 90 (step 621), and in cases where the phasing cycle is longer (step 622), the value of the weight coefficient k of the digital DLL is increased (step 624). On the other hand, when the phasing cycle is shorter, the value of the weight coefficient k of the digital DLL is decreased (step 623).

As a result, the digital DLL satisfactorily responds to the change in the propagation delay. The larger the amount of change in the propagation delay, the shorter the phasing cycle is. Here, the threshold value $P_{0'}$ of the DLL is lowered by decreasing the weight coefficient k of the digital DLL, thus facilitating the digital DLL to respond to the change in the propagation delay. On the other hand, the smaller the amount of change in the propagation delay, the longer the phasing cycle is. Here, the threshold value $P_{0'}$ of the digital DLL is increased by increasing the weight coefficient k of the digital DLL, and the timing of the digital DLL is not varied.

The operation of the second embodiment will now be described in detail with reference to FIG. 4 and FIG. 5. A specific explanation will be given regarding the case where the correlation value $(P_{+1})$ is 0.6, the correlation value $(P_0)$ is 1.0, the correlation value $(P_{-1})$ is 0.7, and the weight coefficient k of the digital DLL is 0.5, for example. The difference $(P_{-1}-P_{+1})$ between the correlation value $(P_{-1})$ and the correlation value $(P_{+1})$ is 0.1 (step 500). The minimum value $(P_{min})$ among the correlation value $(P_{+1})$, the correlation value $(P_0)$ and the correlation value $(P_{-1})$ is 0.6 (step 601). The value calculated by subtracting the minimum correlation value $(P_{min})$ from the correlation value $(P_0)$ is 0.4 (step 602). The value calculated by subtracting the minimum correlation value $(P_{min})$ from the correlation value $(P_0)$ and multiplied by the weight coefficient k of the digital DLL=0.5 is 0.2 (step 604).

The spread code generation timing of the spread code generation section 70 is not varied (step 560), since the result of comparison between the difference $(P_{-1}-P_{+1})$ between the correlation value $(P_{-1})$ and the correlation value $(P_{+1})$, and the threshold value of the DLL $(P_{0'})$ is neither $(P_{-1}-P_{+1})>P_{0'}$ (step 520) nor $(P_{-1}-P_{+1})<-P_{0'}$ (step 550), but $-P_{0'}=0.2\leq(P_{-1}-P_{+1})=0.1\leq P_{0'}=0.2$.

An explanation will now be given regarding the case where the phasing cycle is shorter. Assuming that the correlation value $(P_{+1})$ is 0.6, the correlation value $(P_0)$ is 1.0, the correlation value $(P_{-1})$ is 0.8, and the update step of the weight coefficient k of the digital DLL is 0.1, the weight coefficient k of the digital DLL is 0.4. The difference $(P_{-1}-P_{+1})$ between the correlation value $(P_{-1})$ and the correlation value ($P_{+1}$) is 0.2 (step 500). The minimum value ($P_{min}$) among the correlation value ($P_{+1}$), the correlation value ($P_0$) and the correlation value ($P_{-1}$) is 0.6 (step 601). The value calculated by subtracting the minimum correlation value ($P_{min}$) from the correlation value ($P_0$) is 0.4 (step 602). The value calculated by subtracting the minimum correlation value ($P_{min}$) from the correlation value ($P_0$) and multiplied by the weight coefficient k of the digital DLL=0.4 is 0.16 (step 604).

The spread code generation timing of the spread code generation section 70 is shifted toward the leading edge of phase (step 530), since the result of comparison between the difference ($P_{-1}-P_{+1}$) between the correlation value ($P_1$) and the correlation value ($P_{+1}$), and the threshold value of the DLL ($P_{0'}$) is ($P_{-1}-P_{+1}$)=0.2>$P_{0'}$=0.16 (step 520).

A first effect of the present invention is in that the impairment of the signal quality due to the quantization error produced during sampling may be prevented when the DLL is constructed of a digital circuit with a digital signal processor, for example, for reduction of the circuit size. The reason is that the synchronous timing is prevented from swinging like a pendulum, and thus the impairment of the synchronous holding precision is avoided, since a state is provided which is not subjected to adjustment based on the threshold value which is obtained from the received signal when the synchronous timing is adjusted so as to maximum the value of correlation between the received signal and the spread code for correlation decoding.

A second effect of the present invention resides in that the response of the digital DLL may be improved by extrapolating the amount of change in the propagation delay from the signal error rate or the phasing cycle. This allows the maximum correlation output to be maintained, and prevents the signal quality from being impaired even during high-speed movement. This is because when the amount of change in the propagation delay is large, the threshold value of the DLL is lowered by decreasing the threshold value of the digital DLL, thus facilitating the digital DLL to respond to the change in the propagation delay, whereas when the amount of change in the propagation delay is small, the threshold value of the digital DLL is increased by increasing the weight coefficient of the digital DLL, and the timing of the digital DLL is not varied.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A spread spectrum communications receiver for mobile communications system, comprising:
   correlation means for calculating the correlation value in the peak phase, the correlation value in the phase leading said peak phase and the correlation value in the phase lagging behind said peak phase in a delayed profile of correlation values, on the basis of a received signal;
   spread code generation means;
   a control section which controls said spread code generation means on the basis of the correlation values from said correlation means,
   wherein said control section comprises:
      means for calculating the difference between the correlation value in the Phase leading said peak phase and the correlation value in the phase lagging behind said peak phase as the difference between the correlation values;
      means for determining the threshold value of a digital DLL;
      means for comparing said difference between the correlation values with the threshold value of said digital DLL to control said spread code generation means and advance the phase of the shift register of the correlation means when said difference between the correlation values is greater than the positive threshold value of said digital DLL, and delay the phase of the shift register of said correlation means when said difference between the correlation values is smaller than the negative threshold value of said digital DLL, and not vary the phase of the shift register of said correlation means when said difference between the correlation values is smaller than the positive threshold value of said digital DLL, and said difference between the correlation values is greater than the negative threshold value of said digital DLL and,
      means for calculating the threshold value of said digital DLL by multiplying, by a weight coefficient, the value calculated by subtracting the minimum correlation value among the correlation value in said peak phase, the correlation value in the phase lagging behind said peak phase and the correlation value in the phase leading said peak phase, from the correlation value in said peak phase.

2. A spread spectrum communications receiver for mobile communications system, comprising:
   correlation means for calculating the correlation value in the peak phase, the correlation value in the phase leading said peak phase and the correlation value in the phase lagging behind said peak phase in a delayed profile of correlation values, on the basis of a received signal;
   spread code generation means; and
   a control section which controls said spread code generation means on the basis of the correlation values from said correlation means,
   wherein said control section comprises:
      means of calculating the difference between the correlation value in the phase leading said peak phase and the correlation value in the phase lagging behind said peak phase as the difference between the correlation values;
      means for determining the threshold value of a digital DLL;
      means for comparing said difference between the correlation values with the threshold value of said digital DLL to control said spread code generation means and advance the phase of the shift register of the correlation means when said difference between the correlation values is greater than the positive threshold value of said digital DLL, and delay the phase of the shift register of said correlation means when said difference between the correlation values is smaller than the negative threshold value of said digital DLL, and not vary the phase of the shift register of said correlation means when said difference between the correlation values is smaller than the positive threshold value of said digital DLL, and said difference between the correlation values is greater than the negative threshold value of said digital DLL;

means for determining the error rate of said received signal on the basis of the correlation values from said correlation means, and wherein said control section is designed to increase said weight coefficient when said error rate is high, and to decrease said weight coefficient when said error rate is low, and means for calculating the threshold value of said digital DLL by multiplying, by a weight coefficient, the value calculated by subtracting the minimum correlation value among the correlation value in said peak phase, the correlation value in the phase lagging behind said peak phase and the correlation value in the phase leading said peak phase, from the correlation value in said peak phase.

3. A spread spectrum communications receiver for mobile communications system, comprising:

correlation means for calculating the correlation value in the peak phase, the correlation value in the phase leading said peak phase and the correlation value in the phase lagging behind said peak phase in a delayed profile of correlation values, on the basis of a received signal;

spread code generation means; and a control section which controls said spread code generation means on the basis of the correlation values from said correlation means, wherein said control section comprises:

means for calculating the difference between the correlation value in the phase leading said peak phase and the correlation value in the phase lagging behind said peak phase as the difference between the correlation values;

means for determining the threshold value of a digital DLL;

means for comparing said difference between the correlation values with the threshold value of said digital DLL to control said spread code generation means and advance the phase of the shift register of the correlation means when said difference between the correlation values is greater than the positive threshold value of said digital DLL, and delay the phase of the shift register of said correlation means when said difference between the correlation values is smaller than the negative threshold value of said digital DLL, and not vary the phase of the shift register of said correlation means when said difference between the correlation values is smaller than the positive threshold value of said digital DLL, and said difference between the correlation values is greater than the negative threshold value of said digital DLL;

means for determining the phasing cycle on the basis of the correlation values from said correlation means, referred to the received level, and wherein said control section is designed to increase said weight coefficient when the phasing cycle is long, and to decrease said weight coefficient when the phasing cycle is short.

* * * * *